G. WALKER.
UTENSIL HANDLE AND ATTACHING MEANS THEREFOR.
APPLICATION FILED FEB. 3, 1912.

1,031,495.

Patented July 2, 1912.

WITNESSES
M. A. Shucherow
Lewis Lucia.

INVENTOR
George Walker:
BY
J. F. E. Start.
ATTORNEY

UNITED STATES PATENT OFFICE.

GEORGE WALKER, OF NEW BRITAIN, CONNECTICUT, ASSIGNOR TO LANDERS, FRARY & CLARK, OF NEW BRITAIN, CONNECTICUT, A CORPORATION OF CONNECTICUT.

UTENSIL-HANDLE AND ATTACHING MEANS THEREFOR.

1,031,495.  Specification of Letters Patent.  Patented July 2, 1912.

Application filed February 3, 1912. Serial No. 675,138.

*To all whom it may concern:*

Be it known that I, GEORGE WALKER, a citizen of the United States, and a resident of New Britain, in the county of Hartford and State of Connecticut, have invented certain new and useful Improvements in Utensil-Handles and Attaching Means Therefor, of which the following is a specification.

This invention relates to a novel form of handle and its means of attachment to a utensil.

The invention is illustrated as embodied in what is known as a cake turner but is adaptable for use in other utensils.

Figure 1:
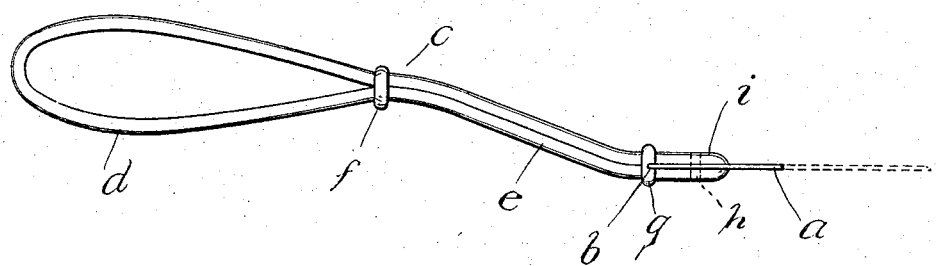
Figure 2:
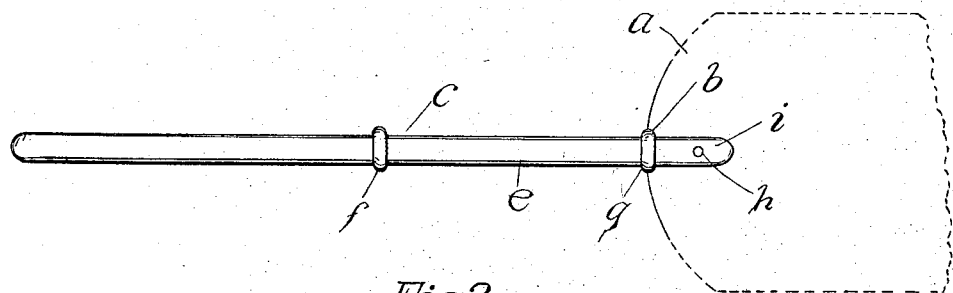
Figure 3:
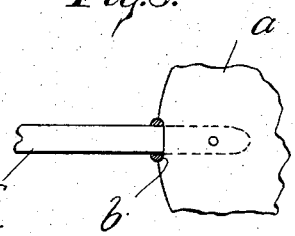

In the drawings—Figure 1 is a plan view of a utensil embodying my invention. Fig. 2 is a side view thereof. Fig. 3 is a detail view showing the blade and handle ready for assembly.

For convenience the invention is illustrated and is described as embodied in what is known as a cake turner.

*a* denotes the blade having a notch *b* centrally of its rear edge.

*c* denotes the handle which is formed from a bar of half round stock looped as at *d* to form a grip, with the curved surface outermost, the two flat surfaces being brought together to form a round shank *e* and held by the rings *f*, *g* which are soldered or otherwise suitably secured in place. The ends of the bar are extended beyond the ring *g* and separated slightly to form jaws *i* to receive the rear end of the blade, the notch in the blade fitting partially around the ring *g*. The rivet *h* passes through the jaws and blades and secures the blade in place and the interlocking of the blades with the ring holds the two parts securely together.

I claim as my invention:

The combination with a utensil, of a handle therefor having a round shank, an open-loop grip at one end of the shank, projecting jaws at the opposite end of the shank spaced to receive the edge of the utensil, said handle being formed from a bar of half round stock bent centrally of its length upon itself, binding rings fixedly secured at each end of the shank, a recess formed in the edge of the utensil and adapted to partly receive the ring, and a rivet passing through said jaws and utensil to secure the parts together against displacement.

GEORGE WALKER.

Witnesses:
A. EUGENE PECK,
OSCAR MOBERG.

Copies of this patent may be obtained for five cents each, by addressing the "Commissioner of Patents, Washington, D. C."